Feb. 17, 1959  M. BURTON  2,873,853
CANNED SLUG
Filed Dec. 3, 1946
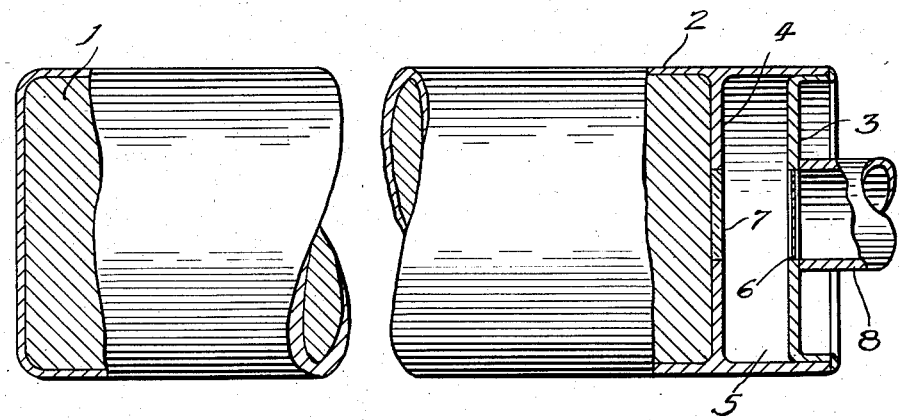
INVENTOR.
Milton Burton
BY
Robert A. Ronander
Attorney

2,873,853
CANNED SLUG

Milton Burton, Mishawaka, Ind., assignor to the United States of America as represented by the United States Atomic Energy Commission Application December 3, 1946, Serial No. 713,659

4 Claims. (Cl. 206—84)

This invention relates to the production of gas generated in materials placed in a neutronic reactor or by other means and more particularly to releasing this gas.

In neutronic reactors of any type, a neutron fissionable isotope such as $U^{233}$, $U^{235}$ or $94^{239}$ or a mixture thereof, is subjected to fission by absorption of neutrons and a self-sustaining chain reaction is established by the neutrons evolved by the fission. As an example, such reactors may comprise bodies or compositions containing such fissionable material, for example, natural uranium, disposed in a neutron slowing material which slows the neutrons to thermal energy. Such slowing material is termed a neutron moderator. Heat evolved during the reaction is removed by passage of a coolant through the reactor or in heat exchange relationship therewith. Specific details of the theory and certain characteristics of such slow neutron reactors are set forth in the copending application of Enrico Fermi and Leo Szilard, Serial No. 568,904, filed December 19, 1944, now Patent No. 2,708,656.

To prevent the coolant from coming into contact with the material and further to prevent reaction of the coolant with the body, a sheath of suitable material is placed therearound and hermetically sealed. In the operation of the neutronic reactor the neutron bombardment of the material may produce a gas therein, through the nuclear reaction or through displacement of atoms of gas present in a compound and their conversion into the free state resulting from neutron irradiation. Accumulation of gas within the sheath can result in a very dangerous condition since it may cause the sheath to bulge or rupture. Since jacketed bodies of this type are usually disposed in closely fitting channels through which coolant flows, even slight bulging may so hamper the flow of coolant as to cause serious local overheating of the reactor. In some instances, such overheating if extensive could cause the reactor to be come uncontrollable. Despite this fact, however, it is not advisable to provide a vent hole in the jacket for releasing the gas as such a vent would break the watertight seal against the coolant in which the jacketed body is immersed and permit objectionable chemical reaction of the coolant with the body.

This invention has as an object the provision of a container which will permit the escape of gases from the body when gas pressure becomes excessive without lateral bulging or rupture of the sheath enclosing the body.

This invention has as a further object the provision of a container for the material (or fissionable material which upon neutron irradiation yields gaseous products) which permits the egress of gas from the container while minimizing or preventing substantial contact of the coolant with the body.

This invention has as a still further object the provision of a simple method of releasing gas from a fissionable material or other reactant enclosed in a sealed container submerged in a fluid coolant.

These and other features of the invention that contribute to its simplicity of construction and dependability of operation will be apparent from the following detailed description of a preferred embodiment taken with the accompanying drawing which is an elevational view, shown partly in section, of a jacketed body illustrating the present invention.

While the present invention is illustrated primarily in connection with the encasing of bodies containing fissionable isotopes, it is to be understood that any other material may be similarly encased for the same reasons and placed in a neutronic reactor for other purposes as, for example, the bombardment of desired materials with neutrons to generate radioactive isotopes of other elements for use in scientific and industrial studies and developments.

As described in the above mentioned application of Enrico Fermi and Leo Szilard continuous channels may be provided through the moderator of a neutronic reactor. These channels are charged with centrally disposed jacketed bodies containing fissionable material. A coolant is passed through the channel and over the jacketed bodies to dissipate the heat generated by the fission in the fissionable material when the neutronic reaction is taking place. This coolant may be water, for example, from a source such as a river, passed once through the reactor and then discarded, or, the water may be cooled and recirculated in a closed system. Diphenyl and other similar coolants may be used in lieu of water.

As mentioned above, the neutronic reactor is operated as described in the copending application of Enrico Fermi and Leo Szilard. In the neutronic reaction when the fissionable material is bombarded by neutrons the resulting fission and its consequent side reactions may produce various gaseous substances. Gaseous substances such as xenon and krypton are produced by radioactive decay of fission fragments, or directly by the fission reaction.

With reference to the drawing, an assemblage is shown of a jacketed body adapted for insertion in the cooled channels of a neutronic reactor. This assemblage comprises a body 1 of suitable material such as, for example, natural uranium jacketed in a close fitting corrosion resistant can or sheath 2 of a suitable substance having a low neutron absorption cross section such as beryllium, aluminum or stainless steel. The container 2 is formed with one open end which is closed by sealing on a cap 3 after the body 1 has been inserted in the container 2. The body 1 is thus hermetically sealed in the container 2.

The body 1 is slightly shorter in longitudinal dimensions than the container 2, and the container 2 is provided with a false bottom 4 which faces against the body 1, and with the walls of the container 2 and the cap 3 forms a chamber 5 at the end of the container 2. To provide an outlet from the chamber 5 the cap 3 has a rupture disc or rupture area 6 where it is thinned or weakened to provide an area where rupture will tend to occur at pressure below those which cause bulging or rupture of the remaining portion of the jacket. The false bottom 4 has an aperture at its center in which a porous wafer 7 constructed of graphite or other gas-permeable material preferably having substantial rigidity is fastened to seal the body 1 from the chamber 5. This porous wafer while gas-permeable should be difficultly permeable to water or other coolant either due to the minute size of the pores or because the wafer is constructed of a material not readily wetted by the coolant.

In the operation of a neutronic reactor containing uranium such as the jacketed body 1 in the drawing the nuclei of the isotope $U^{235}$ are split by thermal neutrons as described in the copending application referred to above. The nuclei are split into smaller particles of smaller charge and mass than uranium and the fission is accompanied by the release of energy and additional neutrons. These particles produced by fission are elements lighter than uranium and include generally the elements in the periodic table occurring between the atomic numbers of 32 and 64 and having mass numbers between 77 and 158. These fission products are radioactive and by radioactive decay are transformed into other isotopes of the same element and/or into other elements, which may be above or below the original radioactive element in the periodic table. This process of transformation by radioactive decay continues until a stable isotope is produced by the decay. Thus, the decay chain from one radioactive substance to another ends eventually in a stable element.

Among these radioactive and stable isotopes of the elements produced by fission are the gaseous elements of krypton and xenon. Krypton has 5 stable isotopes and xenon has 9 stable isotopes. Krypton and xenon are formed both by the fission of uranium nuclei and the decay of radioactive fission products to the stable isotopes of krypton and xenon. The accumulation of the stable isotopes of krypton and xenon as the neutronic reaction proceeds may produce sufficient gas to create pressure within the jacketed body.

As an alternative example of the liberation of stable gases by substances under neutron irradiation, many elements are introduced in the form of chemical compounds, frequently with gaseous constituents as, for example, oxides, fluorides, hydrides, and the like. During irradiation the molecules of the substance may be decomposed as a result of impacts between fast moving neutrons and the constituent atoms of the parent substance. These atoms which have been displaced through the rupturing of the original component assume the chemical properties characteristic of their free state, in general, and consequently if these atoms are gaseous in the free state, there will be a gradual accumulation of free gas in the compound which will, with prolonged exposure, build up pressure within the sheath 2 and the chamber 5.

Referring to the showing in the drawing and the manner of operation of this invention, the jacketed body has produced in it gas pressure by the evolution of gaseous components as above described. This gas accumulates as the neutronic reaction proceeds until a pressure is reached which will force the gase to diffuse through the graphite wafer 7 into the lower pressure chamber 5. As further gas continues to be evolved the pressure in the chamber 5 is thus increased by diffusion of the gas from the body 1 and if neutron bombardment is continued for a long enough period the weakened area 6 in the cap 3 ruptures. In such a case, the gas compressed in the chamber 5 is released while the coolant seeps into the chamber 5. The coolant in chamber 5 is sealed from the material of the body 1 by the graphite wafer 7 secured to the jacket wall and behind which the gases maintain a pressure sufficient to bar the diffusion of the coolant through the barrier from the chamber 5. By means of this novel construction rupture or distortion of the side walls of the sheath with consequent obstruction of passage of coolant is avoided. Such distortion as may occur takes place endwise of the slug and does not interfere with movement of the coolant.

The gases escaping into the coolant in general are radioactive. Consequently, their presence may be detected by the existence of radioactivity in the coolant and the defective or ruptured fissionable body removed from the reactor before serious danger can develop.

Fissionable isotopes in various forms may be incorporated in jackets or sheaths of the type herein described. Thus ordinary uranium metal may be jacketed in this manner. Moreover, uranium-thorium alloys or metal mixtures may be so jacketed. Alternatively uranium oxide, fluoride, carbonate or other compound of a fissionable isotope may be enclosed in a jacket of this type. In addition, other isotopes which yield gaseous products upon neutron bombardment may be jacketed. An example of this type of jacketed body is one containing lithium which upon neutron bombardment produces helium and trithium. In this modification the body 1 may be composed of lithium metal or a lithium compound (hydroxide, carbonate, etc.), and is otherwise identical with the jacketed body containing fissionable material. Upon neutron bombardment of the jacketed body of lithium the accumulation of helium and trithium will develop a gas pressure causing diffusion of the gas into the chamber 5 and, if pressure becomes excessive, rupture of the cap 3 to permit escape of the compressed gas in an endwise direction.

It may be desirable to remove from the chamber 5 and collect the gases produced inside the container 2. This can be done by means of a pipe or tube 8 that is connected to the cap 3 directly over the weakened area 6. Thus gases escaping through the area 6 will pass through tube 8 and can be collected. In the case of a reactor, the tube 8 would extend to the exterior of the reactor where it would enter a collector vessel. The weakened area 6 may be omitted entirely in this arrangement and an opening provided in its place. In any event, the connection between the pipe 8 and the cap 3 should be watertight.

The apparatus described in the foregoing embodies principles which are new in the construction of jacketed bodies in a neutronic reactor. Those principles make possible the release of gas from a jacketed body without contamination of the coolant with radioactive fission products. The features of this invention which are believed to be new are expressly set forth in the accompanying claims.

What is claimed is:

1. An article of manufacture comprising a gas-producing body, a jacket of substantially non-corrodible material enclosing said body, one end of said jacket being spaced away from said body to form a chamber, and a gas permeable, difficultly water-permeable barrier in said chamber adjacent the body and spaced away from said end of the jacket.

2. An article of manufacture comprising a gas-producing body, a jacket of substantially non-corrodible material covering said body, one end of said jacket being spaced away from said body to form a chamber, a gas-permeable, difficultly water-permeable barrier in said chamber adjacent said body and spaced from said end of the jacket, said chamber having a pre-weakened area in its jacket wall.

3. An article of manufacture comprising a gas-producing body, a jacket of substantially non-corrodible material covering said body, one end of said jacket being spaced away from the end of said body to form a chamber, and a gas-permeable, difficultly water-permeable graphite barrier in said chamber adjacent the end of said body and spaced from said end of the jacket.

4. An article of manufacture comprising a gas-producing fissionable body, a substantially non-corrodible jacket covering said fissionable body, one end of said jacket spaced away from said body to form a chamber, said end having pre-weakened area in its wall and a gas-permeable, difficultly water-permeable graphite barrier in said chamber adjacent said fissionable body and spaced away from said end of the jacket.

References Cited in the file of this patent

UNITED STATES PATENTS

| | | |
|---|---|---|
| 2,005,055 | Sprague et al. | June 18, 1935 |
| 2,060,866 | Hetenyi | Nov. 17, 1936 |
| 2,243,754 | Honegger | May 27, 1941 |

FOREIGN PATENTS

| | | |
|---|---|---|
| 104,466 | Germany | July 20, 1899 |